United States Patent
Ozbaysal

(10) Patent No.: US 9,174,314 B2
(45) Date of Patent: Nov. 3, 2015

(54) ISOTHERMAL STRUCTURAL REPAIR OF SUPERALLOY COMPONENTS INCLUDING TURBINE BLADES

(75) Inventor: Kazim Ozbaysal, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 877 days.

(21) Appl. No.: 13/414,751

(22) Filed: Mar. 8, 2012

(65) Prior Publication Data

US 2013/0115092 A1    May 9, 2013

Related U.S. Application Data

(60) Provisional application No. 61/555,109, filed on Nov. 3, 2011.

(51) Int. Cl.
```
F01D 5/14       (2006.01)
B23P 6/04       (2006.01)
B22D 19/10      (2006.01)
B23K 35/30      (2006.01)
B23P 6/00       (2006.01)
F01D 5/00       (2006.01)
```

(52) U.S. Cl.
CPC ................ B23P 6/045 (2013.01); B22D 19/10 (2013.01); B23K 35/3033 (2013.01); B23P 6/007 (2013.01); F01D 5/005 (2013.01); B23K 2201/001 (2013.01); F05D 2230/80 (2013.01); Y10T 428/12639 (2015.01)

(58) Field of Classification Search
CPC .......... F01D 5/30; F01D 25/00; F01D 5/3092
USPC ..................... 29/402.01, 402.03, 402.07, 29/889.2–889.23, 889.7; 416/241 R, 241 B
See application file for complete search history.

(56) References Cited

U.S. PATENT DOCUMENTS

| | | | | |
|---|---|---|---|---|
| 4,808,055 A * | 2/1989 | Wertz et al. | ..................... | 416/224 |
| 5,897,801 A * | 4/1999 | Smashey et al. | ...... | 219/137 WM |
| 6,659,332 B2 * | 12/2003 | Smashey et al. | ............. | 228/119 |
| 7,169,242 B2 * | 1/2007 | Fernihough et al. | .......... | 148/512 |
| 8,394,215 B2 * | 3/2013 | Abriles et al. | ................ | 148/559 |
| 8,561,298 B2 * | 10/2013 | Morin et al. | ................ | 29/889.21 |
| 2009/0057275 A1 * | 3/2009 | Chen et al. | ................... | 219/76.1 |
| 2009/0320966 A1 | 12/2009 | Morin | | |

FOREIGN PATENT DOCUMENTS

WO    0141970 A1    6/2001

OTHER PUBLICATIONS

Harris et al., CMSX Single Crystal Alloys Properties & Performance, Superalloys 1984 eds., pp. 221-230.*

* cited by examiner

*Primary Examiner* — Nathaniel Wiehe
*Assistant Examiner* — Woody A Lee, Jr.

(57) ABSTRACT

Structural repair of cracks and other defects in superalloy components, such as steam or gas turbine blades in stationary or aero gas turbines, are performed by heating the blade substrate to an isothermal hold temperature below the substrate's incipient melting point and filling the crack with molten superalloy filler material. The molten filler solidifies into a casting and bonds with the component substrate at the isothermal hold temperature. Heat treatment processes are completed, so that the former crack is filled with cast superalloy material having identical or similar structural properties as the adjoining substrate superalloy material. The casting repair method may be utilized universally for all types of superalloy component defects, including those previously repaired by cosmetic, lower strength welding or brazing methods.

11 Claims, 3 Drawing Sheets

ISOTHERMAL STRUCTURAL REPAIR OF SUPERALLOY COMPONENTS INCLUDING TURBINE BLADES

CLAIM TO PRIORITY

This application claims the benefit of United States provisional patent application entitled "Isothermal Structural Repair of Gas Turbine Components", filed Nov. 3, 2011 and assigned Ser. No. 61/555,109, which is incorporated by reference herein.

BACKGROUND OF THE DISCLOSURE

1. Field of the Invention

The invention relates to structural repair of defects in advanced superalloy components. In some embodiments, the invention relates to repair of cracks or other defects in superalloy turbine blades that are used in steam or gas turbines (industrial or aero), by filling the crack with molten superalloy filler, in a manner that does not significantly reduce mechanical structural or material properties of the superalloy blade substrate. The molten filler superalloy solidifies into a cast in place patch of filler superalloy.

2. Description of the Prior Art

"Structural" repair of gas turbine or other superalloy components is commonly recognized as replacing damaged material with matching alloy material and achieving mechanical properties, such as strength, that are close to the original manufacture component specifications (e.g., seventy percent ultimate tensile strength of the original specification). For example, it is preferable to perform structural repairs on turbine blades that have experienced cracks, so that risk of further crack growth is reduced, and the blades are restored to original material structural and dimensional specifications.

Structural repair of nickel and cobalt based superalloy material that is used to manufacture turbine components, such as cast turbine blades, is challenging, due to the metallurgical properties of the finished blade material. For example, a superalloy having more than 6% by weight percentage aggregate aluminum or titanium content, such as CM247 or DS247 alloy, is more susceptible to strain age cracking when subjected to high-temperature welding than a lower aluminum-titanium content X-750 superalloy. The finished turbine blade alloys are typically strengthened during post casting heat treatments, which render them difficult on which to perform subsequent structural repair welding. Currently used welding processes for superalloy structural fabrication or repair generally involve substantial melting of the substrate adjoining the weld preparation, and complete melting of the welding rod or other filler material added. When a blade constructed of such a material is welded with rods of the same or similar alloy, the blade is susceptible to solidification (aka liquation) cracking within and proximate to the weld, and/or strain age (aka reheat) cracking during subsequent heat treatment, processes intended to restore the superalloy original strength and other material properties comparable to a new component.

In comparison to structural repair, "cosmetic" repair of superalloys is recognized as replacing damaged material with unmatching alloy material of lesser structural property specifications, where the localized original structural performance is not needed. For example, cosmetic repair may be used in order to restore the repaired component's original profile geometry. As noted above, it is desirable to perform structural repairs on surface cracks in order to reduce their likelihood of subsequent spreading when the component is returned to service. Conversely, an example of cosmetic repair is for filling surface pits (as opposed to structural cracks) on a turbine blade airfoil in order to restore its original aerodynamic profile, where the material properties of the blade's localized exterior surface is not critical for structural integrity of the entire blade. Cosmetic repair is often achieved by using oxidation resistant weld or braze alloys of lower strength than the blade body superalloy substrate, but having higher ductility and lower application temperature that does not negatively impact the superalloy substrate's material properties.

Given the shortcomings of superalloy structural repair welding, often the only commercially acceptable solution is to scrap damaged turbine blades that require structural repair, because past experience has shown limited success of such structural repairs. Thus repairs have been limited to those that have in the past been proven to be performed successfully by cosmetic welding, employing more ductile welding rod filler materials with reduced structural strength. In circumstances where structural welding repairs are successfully performed, cosmetic welding repairs are often performed on blade portions that do not need structural repairs. This required two different repair modes to be used on the same blade.

Thus, a need exists in the art for a method for performing structural repairs on surfaces of superalloy components, such as turbine blades, so structurally damaging cracks and other surface defects can be repaired.

Another need exists in the art to increase successful rates of structural repairs on surfaces of superalloy components, such as turbine blades, so that damaged blade scrap rates can be reduced.

Yet another need exists in the art for a method for performing structural repairs of superalloy components, such as turbine blades, with proven, repeatable repair techniques and post-repair heat treatment procedures that do not require complex welding.

Another need also exists in the art for a universal method for performing repairs of superalloy components, such as turbine blades that can be used for repair of all blade defects.

SUMMARY OF THE INVENTION

Accordingly, an object of the invention is to perform structural repairs of superalloy components, such as turbine blades, so structural cracks and other surface defects can be repaired.

Another object of the present invention is to increase the likelihood of performing successful structural repair of superalloy components, such as turbine blades, so that damaged component scrap rates can be reduced.

Yet another object of the present invention is to perform structural repair of superalloy components, such as turbine blades, with proven, repeatable repair techniques and post-repair heat treatment procedures that do not require complex welding.

An additional object of the present invention is to create a universal method for performing repairs of superalloy components, such as turbine blades that if desired can be used for repair of all blade defects.

These and other objects are achieved in accordance with the present invention by structurally repairing potentially all defects in superalloy material components, such as steam or gas turbine blades in stationary or aero gas turbines by a single, potentially universal, repair method. When performing the repair, the region surrounding the surface defect crack is cleaned. The cleaned region of the blade component (or the entire component) is heated to a desired temperature. The now heated blade crack is filled with molten filler superalloy material that is the same as the blade substrate alloy, or another superalloy material having comparable structural properties. The molten filler alloy subsequently solidifies and fills at least a portion of the crack or other defect, creating thereby a cast in place patch or filling at the isothermally heated temperature. One or more casting filling passes are completed in order to fill the crack or other defect to a desired level or completely with molten filler alloy. Isothermal build up of the now crack-filled superalloy component is completed. Upon completion of build up, excess filler alloy may be removed to conform the crack surface profile with that of the adjoining blade or other component substrate.

Embodiments of the present invention also feature a repaired superalloy component, such as for example a turbine blade, with a superalloy substrate having a crack therein. The crack is filled with a cast in place patch of filler superalloy selected from the group consisting of the identical superalloy as that of the superalloy component substrate and other superalloys having comparable structural properties. The patch may include a plurality of layers of filler superalloy. The substrate and filler alloys may be CM247 or DS247 superalloy.

Embodiments of the present invention additionally feature a repaired superalloy component, such as for example a turbine blade, with a superalloy substrate having a crack therein. The crack is filled with a cast in place patch of filler superalloy selected from the group consisting of the identical superalloy as the superalloy component substrate and other superalloys having comparable structural properties. The cast in place patch is formed by the process of heating the superalloy component substrate to a desired isothermal hold temperature. Thereafter the crack is at least partially filled with molten superalloy filler. Thereafter the superalloy filler solidifies to form the cast patch. The patch may include a plurality of layers of filler superalloy. The substrate and filler alloys may be CM247 or DS247 superalloy. The process may be performed in an oven under protective atmosphere and/or under a vacuum pressure less than ambient air pressure.

Yet other embodiments of the present invention feature a method for repairing a cracked superalloy component with a substrate region having a crack therein. In practicing the method, the substrate region is heated to a desired isothermal temperature. The crack is then at least partially filled with molten superalloy filler. The molten filler is solidified to form a cast in place patch. The patch may include a plurality of layers of filler superalloy formed by depositing a plurality of sequential layers of molten superalloy filler. The sequential layer depositing thereby fills any filler cracks appearing in previously deposited superalloy filler. The substrate and filler alloys may be CM247 or DS247 superalloy. The process may be performed in an oven under controlled melt atmosphere of an inert gas or under a vacuum pressure less than ambient air pressure.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in structurally repairing defects in superalloy material components, such as steam or gas turbine blades in stationary or aero gas turbines. The present invention optionally facilitates use of a single universal repair method for all superalloy component defects, including those previously repaired by "cosmetic" non-structural repair methods, so that a repair facility only need to be equipped to perform one type of universal repair process.

Figure 1:
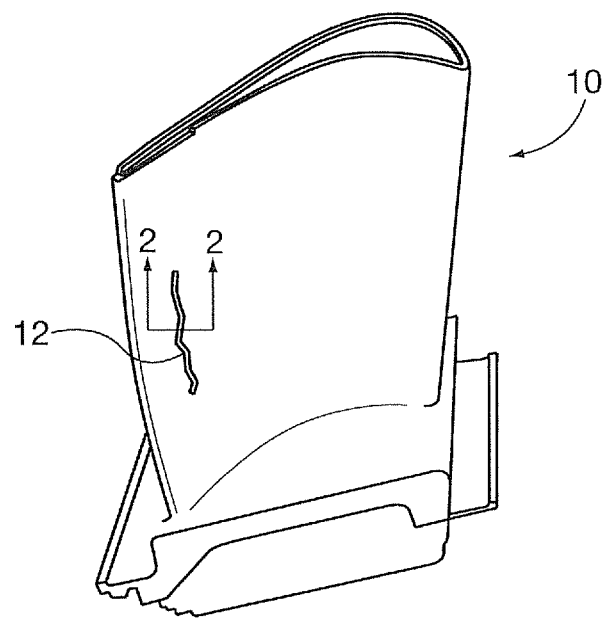
FIG. 1 shows a perspective view of a superalloy turbine blade component having a crack defect within its substrate.
Figure 2:
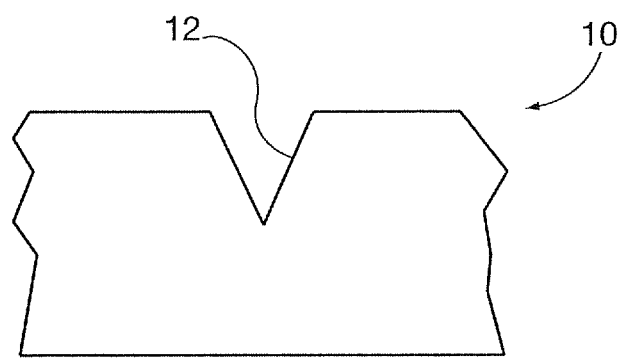
FIG. 2 is a cross-sectional schematic view of the turbine blade component of FIG. 1, taken along 2-2 thereof.
Figure 3:
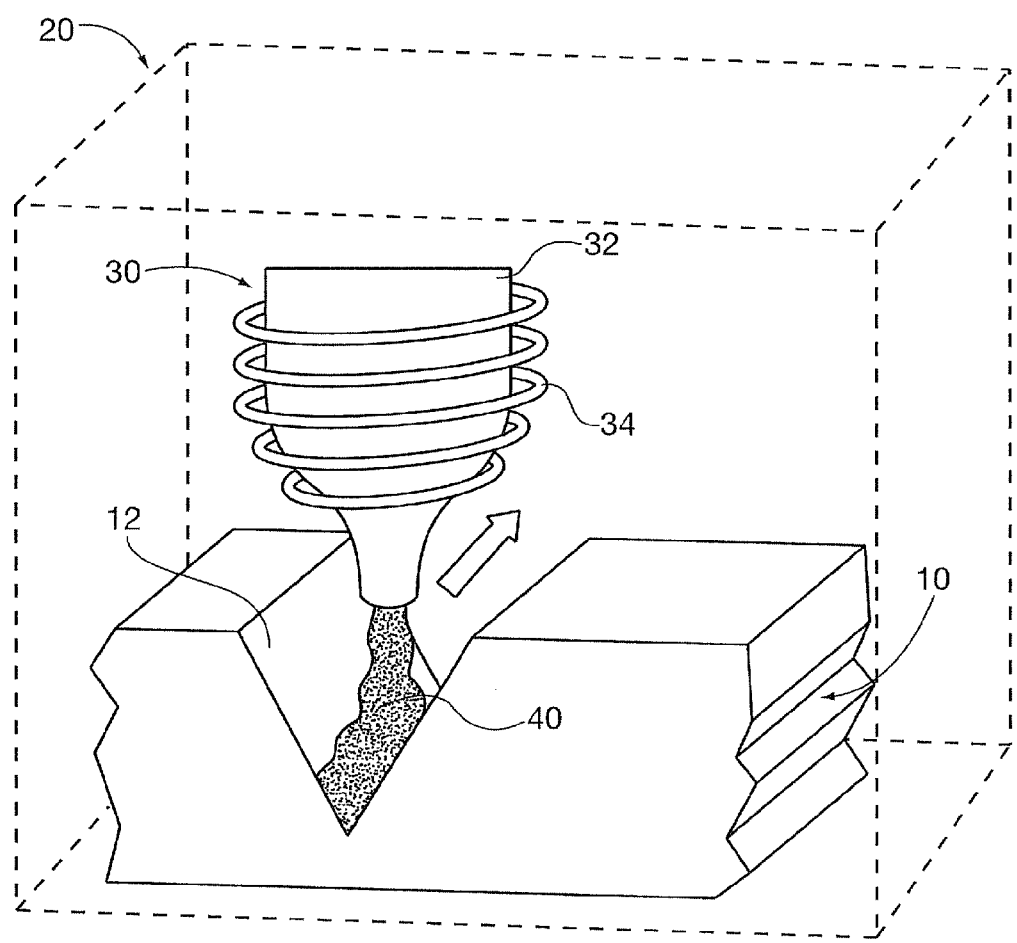
FIG. 3 is a schematic perspective view of a repair apparatus for structurally repairing a crack defect in a superalloy component.

FIGS. 1 and 2 show an exemplary stationary gas turbine blade, having a substrate 10 and a crack defect 12. When performing the repair, the region surrounding the surface defect crack 12 is cleaned. Referring to FIG. 3, the cleaned region of the blade component substrate 10 (or the entire component) is preferably heated within a protective atmosphere of a vacuum or an inert gas in an oven 20 to a desired temperature, below the blade incipient melting temperature and above 800° C. (1472° F.). A known electric induction heater 30 is in or in communication with the oven 20. The heater 30 includes a crucible tube 32 that is constructed of quartz, ruby or other known material suitable for melting powdered superalloy material to a molten state. The heater 30 also has induction heating coil elements 34 that melt the superalloy filler material 40 within the crucible 32 at a temperature above its melting point.

Figure 4:
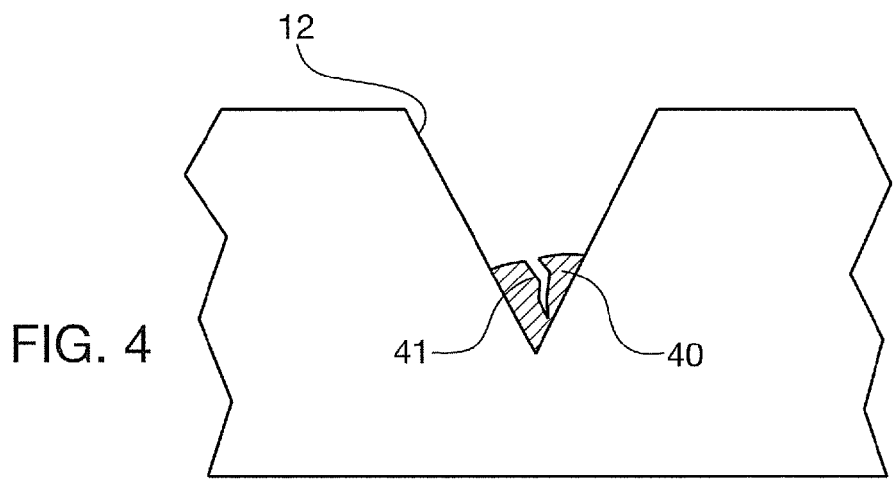
FIG. 4 is a cross-sectional schematic view similar to that of FIG. 2, showing partial structural crack repair.
Figure 5:
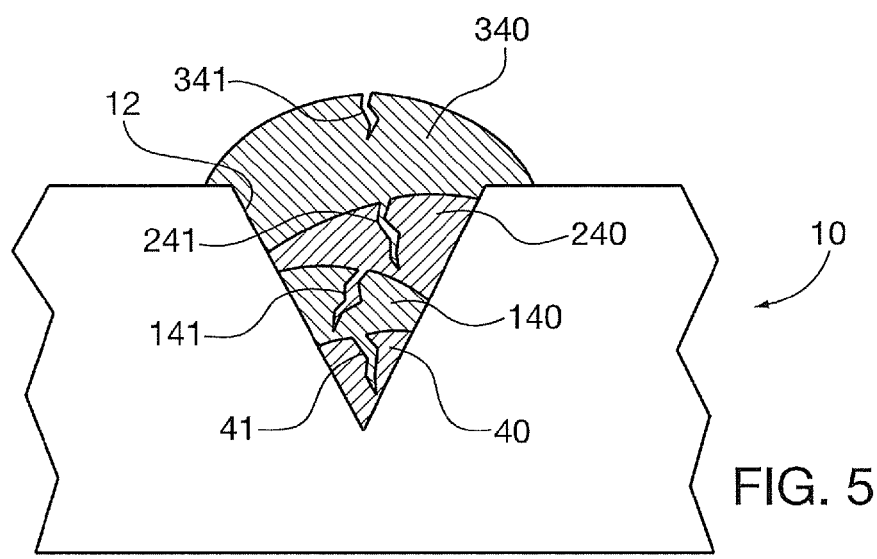
FIG. 5 is a cross-sectional schematic view similar to that of FIG. 4 showing completed structural crack repair.

Referring to FIGS. 4 and 5, the now heated blade crack 12 is filled with molten filler superalloy material 40 that is the same as the blade substrate alloy or another superalloy material having comparable structural properties. For example, a superalloy component constructed of CM247 or DS247 superalloy is desirably repaired with molten CM247 filler alloy. The molten filler alloy material 40 is deposited along the length of the crack 12 by relative movement between the crack and the crucible 32. The poured filler alloy material 40 fuses with the substrate material 10 at the isothermal hold temperature without any significant localized melting of the substrate material. The filler alloy material 40 subsequently hardens at the relatively lower isothermal hold temperature within the oven 20 to form a filler patch within at least a portion of the crack 12 or other defect. As the filler alloy material 40 solidifies and hardens into a filler patch one or more filler cracks 41 may form therein. One or more filling passes 140, 240, 340, etc., are deposited in order to fill the crack 12 or other defect completely with noncracked filler alloy. Cracks 41, 141, 241, etc., in the respective filler material patches 40, 140, 240 are filled by subsequently deposited layers until all filler material in the crack 12 below the substrate 10 surface is crack free.

Figure 6:
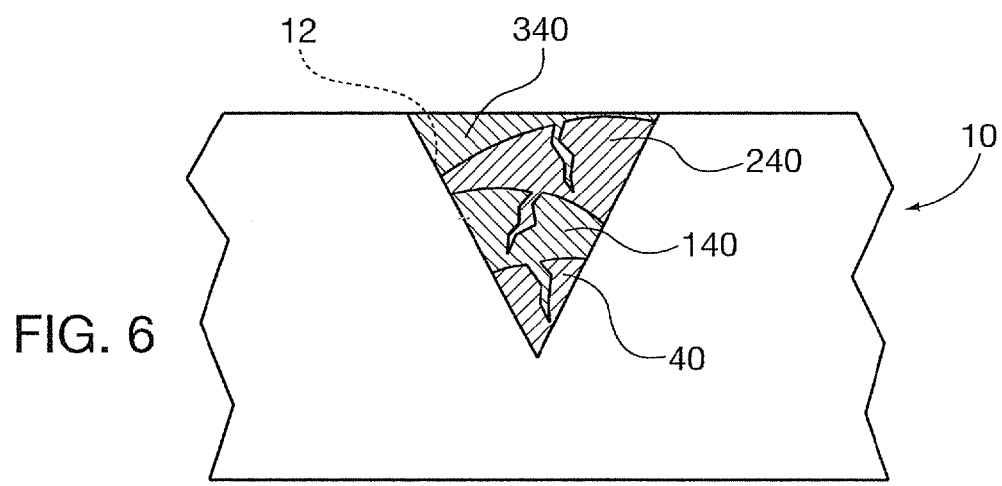
FIG. 6 is a cross-sectional schematic view of the structural repair of FIG. 5, wherein excess filler casting has been removed to conform the component surface profile in the repair zone to that of the adjoining blade component substrate.

As shown in FIG. 5, cracks 41, 141 and 241 that are below the surface contour of the blade substrate 10 are filled by subsequently deposited layers until the last crack 341 layer is above the substrate surface. Any desired isothermal heating of the now crack-filled superalloy component substrate 10 is completed. Upon completion of any isothermal heating or other cooling processes, excess filler alloy 340 may be removed to conform the crack surface profile with that of the adjoining blade or other component substrate, as shown in FIG. 6.

In known repair or fabrication methods, crack recess 12 would have been filled by heat application of softer filler material (cosmetic repair) or by filler material of similar hardness. As previously discussed, welding techniques applying superalloy filler generally induce undesirable cracks in the superalloy component during welding or during subsequent post-welding heat treatment.

In conventional structural superalloy welding a nugget is often formed in the welded zone that is subject to excessive shrinkage stresses during solidification. That is, surrounding material in the unmelted substrate 10 is not free to yield to accommodate shrinkage stresses during solidification of the thereby trapped weld nugget. In contrast the present invention isothermal filler alloy patch casting repair process overfills any filler patch solidification cracks below the repaired substrate surface with a subsequently deposited molten filler layer.

The now repaired superalloy component substrate 10 no longer has surface damage, which is replaced by fresh superalloy repair filler material 40, 410, 240, 340, having substantially similar material properties to the original substrate material. Specifically, surface hardness and strength properties within the hardened filler alloy patch are substantially similar to those of the original surrounding material. Mechanical or thermally induced stresses within the component substrate 10 can be transferred across the former crack 12 that is now filled by the superalloy filler material 40, 140, 240, 340, due to their now bonded relationship. Relative affixation between the repaired superalloy component substrate 10 and the new filler patch superalloy 40, 140, 240, 340 along the former crack surface 12 is sufficient to maintain structural integrity.

The localized bonding of the new solidified filler patch 40, 140, 240, 340 and the superalloy substrate 10 along the former crack 12 surface does not significantly negatively impact structural material properties of the now repaired component substrate 10. Post repair heat treatment (if any is required) minimizes—if not totally eliminates—subsequent risk of repaired component strain age cracking. Thus, time and expense of superalloy component substrate 10 repair may be undertaken with the repair methods of the present invention, without undue risk of repair failure. In the power generation field, even cracked Row 1 turbine blades constructed of difficult to repair CM247 or DS247 superalloy may be repaired without the need to scrap and replace them with new blades. It is possible to utilize the present invention defect repair process on all defects, including those previously repaired by non structural "cosmetic" repair methods.

When performing the isothermal casting repair methods of the present invention, the overall objective is to achieve localized bonding between the superalloy subcomponent substrate 10 along the crack 12 surface and the cast in place filler alloy solidified patch 40, without significantly impacting the superalloy material properties of either material. Unlike known welding techniques that tend to liquefy the superalloy substrate 10 (and thus negatively alter material properties making it susceptible to subsequent cracking), the isothermal casting processes of the present invention avoid gross changes in the superalloy substrate 10.

Although various embodiments which incorporate the teachings of the present invention have been shown and described in detail herein, those skilled in the art can readily devise many other varied embodiments that still incorporate these teachings.

What is claimed is:

1. A method for repairing a cracked superalloy component, comprising:
   providing a superalloy component with a substrate region having a crack therein;
   heating the substrate region to a desired isothermal hold temperature in a range of between above 800° C. (1472° F.) and below said substrate's incipient melting point;
   melting superalloy filler in a heater;
   isothermally filling the crack at least partially with molten superalloy filler poured from the heater; and
   solidifying the cast superalloy filler to form a diffusion bonded, crack-free patch, without any significant localized melting of the substrate material that might otherwise induce solidification crack formation.

2. The method of claim 1, wherein the substrate and filler superalloys are identical.

3. The method component of claim 1, wherein the substrate and filler superalloys are selected from the group consisting of CM247 or DS247 superalloys.

4. The method of claim 1, wherein the component is a turbine blade.

5. The method of claim 1, wherein the patch comprises a plurality of layers of filler superalloy.

6. The method component of claim 1, wherein the patch defines an outer surface dimensional profile that conforms with a corresponding dimensional profile of an outer surface of the substrate that adjoins the patch.

7. The method of claim 1, wherein the heating, filling and solidifying steps are performed in an inert gas atmosphere.

8. The method of claim 1, wherein the heating step is performed in an oven under a protective inert gas atmosphere.

9. The method of claim 1, wherein the filling step is performed by depositing a plurality of sequential layers of molten superalloy filler, including filling thereby any filler cracks appearing in previously deposited superalloy filler.

10. The method of claim 1, wherein the heating, filling and solidifying steps are performed in a vacuum.

11. The method of claim 1, further comprising heat treating the component substrate and patch after the solidifying step.

* * * * *